Patented Jan. 3, 1933

1,893,385

UNITED STATES PATENT OFFICE

WALTER WETTSTEIN, OF MONTHEY, SWITZERLAND, ASSIGNOR TO THE FIRM SOCIETY OF CHEMICAL INDUSTRY IN BASLE, OF BASEL, SWITZERLAND

PROCESS FOR OBTAINING CONCENTRATED SULPHUR DIOXIDE

No Drawing. Application filed May 10, 1930, Serial No. 451,523, and in Switzerland May 15, 1929.

The usual method of separating sulphurous acid from gases with which it is diluted consists in washing the cold gases with water on the counter-current principle and expelling the $SO_2$ by subsequently heating the water. In thus treating a gas containing 12 per cent. of sulphur dioxide there is obtained a solution containing about 10 grams of $SO_2$ per litre. This solution must be heated to about 100° C. in order to expel the $SO_2$. This operation necessitates a large consumption of steam and a complicated apparatus.

According to this invention sulphur dioxide is extracted from gases by washing them with a mixture of water and a cyclic organic base which is liquid at ordinary temperature and is not completely miscible with water, such as aniline, the toluidines, the anisidines, the phenetidines, the N-mono- and dialkyl derivatives of these products, such as monomethyl- or dimethyl-aniline, heterocyclic bases, such as the homologues of pyridine which have a boiling point which is higher than 180° C., quinoline, and the like, at room temperature, or to a somewhat higher temperature; when the solution thus obtained is heated the sulphur dioxide is expelled by hydrolysis.

For example gas containing 5 per cent. of sulphur dioxide is passed through or washed by counter-current with a mixture of 5 parts of water and 1.5 parts of aniline at 35° C. The sulphur dioxide is rapidly and almost completely absorbed. There is obtained a solution having a degree of saturation of 96 grams of $SO_2$ per litre; if the absorption be carried further the sulphite or bisulphite compound of aniline begins to crystallize. The solution containing 96 grams of $SO_2$ per litre boils at 85° C. and yields when heated between 35° C.–96° C. 62 grams of $SO_2$ per litre.

When a higher degree of concentration in $SO_2$ is desired there is produced a crystalline magma. In this case it is preferable to operate with a mixture of 5 parts of aniline and 2 parts of water at about 30° C. as then the crystalline magma remains so fluid until its concentration is 130 grams per litre that stirring is still quite easy. The absorption is still substantially complete at this concentration. For the sake of the fluidity of the mixture it is, however, advantageous to interrupt the operation at this concentration. At higher concentrations stirring is difficult, while if a mixture richer in water is used the absorption is incomplete. A mixture of the last defined concentration boils at about 80° C. and retains at 96–97° C. only about 30 grams of $SO_2$ per litre. It has, therefore, yielded 100 grams of $SO_2$ per litre.

The removal of the $SO_2$ from the mixture containing it is best conducted in a reflux apparatus. Traces of aniline in the gas stream may be retained by washing the gas with sulphuric acid or by an absorption agent, such as activated charcoal.

When aqueous mixtures which remain completely liquid are used, the absorption and the removal of gas can be conducted continuously on the counter-current principle; when a mixture rich in aniline is used, however, it is better to remove the gas intermittently because of the thick condition of the saturated mixture.

What I claim is:—

1. A process for obtaining concentrated sulphur dioxide from gases with which it is diluted by absorbing the sulphur dioxide by means of a suspension in water of a cyclic organic base which is liquid at ordinary temperature and is not completely miscible with water, and expelling the absorbed gas by heating the mixture.

2. A process for obtaining concentrated sulphur dioxide from gases with which it is diluted by absorbing the sulphur dioxide by means of a suspension in water of an aromatic base which is liquid at ordinary temperature, and expelling the absorbed gas by heating the mixture.

3. A process for obtaining concentrated sulphur dioxide from gases with which it is diluted by absorbing the sulphur dioxide by means of a suspension in water of a mononuclear aromatic base which is liquid at ordinary temperature, and expelling the absorbed gas by heating the mixture.

4. A process for obtaining concentrated sulphur dioxide from gases with which it is diluted by absorbing the sulphur dioxide by means of a suspension in water of a mononuclear primary aromatic base which is liquid at ordinary temperature, and expelling the absorbed gas by heating the mixture.

5. A process for obtaining concentrated sulphur dioxide from gases with which it is diluted by absorbing the sulphur dioxide by means of a suspension in water of aniline, and expelling the absorbed gas by heating the mixture.

In witness whereof I have hereunto signed my name this 28 day of April 1930.

WALTER WETTSTEIN.